United States Patent [19]

Ortega

[11] 3,947,601

[45] Mar. 30, 1976

[54] FOOD FOR SEA LIFE COMPRISING HOMOGENIZED MIXTURE OF SEA URCHIN EGGS AND SODIUM SULFITE PRESERVATIVE

[76] Inventor: Michael Ortega, 20031 SW. Birch, Santa Ana, Calif. 92701

[22] Filed: July 18, 1974

[21] Appl. No.: 489,582

[52] U.S. Cl. ............. 426/330.1; 426/335; 426/532; 426/643; 426/519; 426/521; 426/805
[51] Int. Cl.² ........................................... A23K 1/18
[58] Field of Search ........... 426/212, 364, 376, 805, 426/521, 330.1, 532, 335, 643, 519

[56] References Cited
UNITED STATES PATENTS

| | | | |
|---|---|---|---|
| 3,591,389 | 7/1971 | Schneider | 426/805 |
| 3,852,489 | 12/1974 | Yip | 426/212 |

FOREIGN PATENTS OR APPLICATIONS

| | | | |
|---|---|---|---|
| 46-34733 | 12/1971 | Japan | 426/376 |
| 46-38538 | 12/1971 | Japan | 426/212 |
| 46-37233 | 1/1971 | Japan | 426/376 |

*Primary Examiner*—Norman Yudkoff
*Assistant Examiner*—Curtis P. Ribando
*Attorney, Agent, or Firm*—Grover A. Frater

[57] ABSTRACT

A food for fish and invertebrates which is compatible with the ecology in a closed circuit salt water aquarium containing both fish and invertebrates contains broken sea urchin eggs, water, sodium nitrite, sodium chloride, and citric acid. The food is compounded by breaking the sea urchin eggs and blending them with the preservatives and water, and by pasturizing the blended material. In preferred form, the food is also homogenized.

6 Claims, No Drawings and citric acid to a kilogram of sea urchin eggs has been found to be satisfactory.

FOOD FOR SEA LIFE COMPRISING HOMOGENIZED MIXTURE OF SEA URCHIN EGGS AND SODIUM SULFITE PRESERVATIVE

This invention relates to improvements in food for sea life and to the method of making the same.

BACKGROUND

The oceans present a rather constant environment for the life it holds. While temperature and salinity and other environmental factors may vary from place to place, in any given region of the ocean those environmental factors remain quite constant. As a consequence, the creatures of the sea have generally not developed adaptive mechanisms. That is true both for invertebrates and for fish, although fish can often tolerate more change in environmental conditions than can the invertebrates.

Their inability to adapt to changed conditions has made it very difficult to preserve sea life in aquariums. Attempts to reproduce the environment of the ocean in small aquariums, less than several thousands of gallons in size, have met with failure because it is not practical to deal with excretions as they are in the sea. Those excretions are largely ammonia which is highly toxic both to fish and to invertebrates. The only practical way that has been discovered to eliminate the ammonia in aquariums is to rely upon reduction to nitrate form by bacterial action coupled with periodic replacement of part of the aquarium water. Typically, 25 percent of the aquarium water is replaced monthly. Moreover, it is necessary to remove a major portion of unused food, especially the protein matter, if water quality is to be maintained in a non-toxic condition.

Most salt water fish can live for an indefinite period in water that is subjected to that kind of a purification program. Even invertebrates, which as a class are much less adaptable than fish, can live for long periods of time in water that is treated in that fashion and which does not contain fish. Survival of the invertebrates is much less certain when they are combined with fish. The chemical balance is so delicate that introduction of even one additional fish in a forty gallon sized aquarium may result in the death of some invertebrates before the additional ammonia discharge can be accommodated by an increase in bacterial action.

Since it is usually not possible to furnish the inhabitants of an aquarium with the kind of food that they lived on in the sea prior to being captured, it is necessary to provide a substitute food, and that substitute must be one that will provide adequate nourishment for the creatures without upsetting the ecological balance in their synthesized environment. To provide a food that can be accommodated by that ecological system is one of the objects of the invention.

The filter feeders, the tube worms, anemones, corals, and the like, subsist on plankton in their natural environment. No practical means has been found to supply plankton for smaller aquariums. The problem is to find a substitute capable of adequately nourishing the filter feeders and the fish, too, if possible. The substitute must have a mechanical form which permits its being eaten or filtered by both kinds of creatures and it must be compatable with aquarium ecology. While not essential, it is very desirable that the food be such that it is visible when placed in the aquarium to enable a determination that the food actually has reached the filter feeders.

The synthesized environment sometimes includes medicinal substances introduced to treat ailments suffered by the fish. In general, salt water invertebrates are unable to tolerate those medicines, so they, or the fish, must be removed to a hospital tank before the fish are treated. The food provided by the invention does not overcome that problem, but it does have the advantage that it does not appear to affect the action of most of the medicinal substances that are currently employed for treating fish ailments.

The problem of maintaining an ecological balance is coupled with the mechanical problem of getting food to the filter feeders. The filter feeders are generally located at the bottom of the aquarium, whereas the food must be introduced from the top of the aquarium.

SUMMARY OF THE INVENTION

It is an object of the invention to provide a food for sea creatures which is compatible with the ecological system which is maintained in salt water aquariums. It is an object to provide food that is useful both for invertebrates and for fish. It is an object to provide a food for filter feeders which can be dispersed in the water in the vicinity of those creatures, and in that connection, it is an object to provide a food that will form a visible cloud, thus to enable determination that the food is actually reaching its goal. Another object is to provide a food which will be dispersed through the water of an aquarium with minimum settling to the bottom so that excess food can be removed by a conventional protein trap.

These several objects are accomplished in the invention by providing a food consisting largely of sea urchin eggs which have been beaten so that the eggs have been opened and constitute a uniform mass. The mass is pasturized and, in the preferred form, is homogenized. In the preferred form of the invention, the sea urchin eggs are preserved against destructive bacterial action by the addition of small quantities of sodium sulfite and by the addition of citric acid so that a pH of 5.3 to 6.5 is maintained. It is preferred that the sea urchin eggs be washed in fresh water. However, that removes natural salts. To return that salt, which acts as a preservative, from 4 to 7 grams of salt is added to each kilogram of washed sea urchin eggs.

Those ingredients are combined with water. Food intended for filter feeders and small fish contain approximately equal parts, by weight, of sea urchin eggs and fresh water. That composition is advantageously packaged in a container, such as a squeeze bottle, which enables the food to be squirted into the body of aquarium water from above, whereby a cloud is formed and dispersion is facilitated. When the object is to feed larger fish, the proportion of water is advantageously reduced so that the water content is approximately one-third, by weight, of the content of sea urchin eggs.

The food is prepared by blending, pasturizing and homogenizing a mixture of sea urchin eggs and water. In the preferred process for making the food, preservative materials are added to the mixture prior to blending. During blending, or beating, the sea urchin eggs are broken and blended into a homogeneous smooth liquid. The preservatives are throughly blended with the sea urchin eggs. In any event, the preservatives should be added prior to the pasturization step. The addition of between 10 and 12 grams of sodium sulfite per kilogram of sea urchin eggs will serve to preserve the product for 6 months or more without refrigeration. It is preferred that the food be kept cool, but even that is not necessary if citric acid is added to lower the pH of the food to a value of between 5.3 to 6.5. About 4 to 7 grams of citric acid is added.

One of the advantages of the invention lies in the fact that the protein content of the food may be increased by merely adding protein rich animal matter to the sea urchin mixture. Vegetable proteins are not acceptable, but animal proteins are. The preferred protein supplement is finely divided dried shrimp. The quantity of that material should not exceed the quantity of sea urchin eggs. Increasing the proportion of supplemental protein material does not affect the chemical problem, but it does have an adverse effect on the mechanical quality of the food. Too much supplemental material tends to prevent formation of a cloud that disperses through the whole aquarium.

If supplemental protein is added, it is advantageously added at the blending stage. It is blended with the sea urchin eggs to form a uniform liquid, or viscous paste material. The supplemental protein material should be dried or otherwise treated so that it will not be subject to deteriorating bacterial action. That rule must be observed so that the ratio of preservative sodium sulfite can be maintained in the range of 10 to 12 grams per kilogram of sea urchin eggs.

The preferred form of food according to the invention includes washed sea urchin eggs combined with the preservatives sodium sulfite in the amount of 10 to 12 grams per kilogram of sea urchin eggs, sodium chloride in the amount of 4 to 7 grams per kilogram of sea urchin eggs, and citric acid in a quantity sufficient to bring the pH of the food to a value between 5.3 to 6.5. Four to 7 grams of citric acid is usually enough. The mixture includes substantially equal parts, by weight, of sea urchin eggs and fresh tap water. That mixture is beaten and blended and homogenized and pasturized to a smooth uniform liquid. Salt water may be substituted for tap water, but tap water is preferred because the product, when made with fresh water, is suitable for feeding fresh water fish as well as salt water creatures. When salt water is used, less sodium chloride is added to the urchin eggs.

That preferred food is advantageously prepared by mixing washed and cleaned sea urchin eggs and water and preservative materials, and supplemental dried animal protein matter, if any, followed by blending of the mixture such that the individual sea urchin eggs are broken open and such that a uniform smooth liquid is formed. That smooth liquid is then pasturized at a temperature between 140° and 185°. Either before or after, but advantageously after, the pasturization step, the mixture is homogenized by forcing it through a homoginizer at a pressure equal to or greater than 100 kilograms per square centimeter.

If it is desired to supplement the protein content of that preferred material, a finely divided animal protein substance is added. In the preferred embodiment, finely divided dried shrimp is added. The dried shrimp is added to the other ingredients prior to the blending stages so that it is subjected to blending, pasturization, and homogenization along with the other ingredients.

When the food is intended for consumption by larger fish other than "fry", the food is made as described above with the exception that a smaller quantity of water is employed. The water content may be reduced to as little as one-third of the combined weight of sea urchin eggs and supplemental protein matter, if any. As before, fresh water is preferred so that the resultant food will be suitable both for fresh water and salt water fish. Salt water, similar in composition to ocean water, may be substituted for fresh water if the food is destined only for salt water fish.

Although I have described certain specific embodiments of my invention, I am full aware that many modifications thereof are possible. My invention, therefore, is not to be restricted except insofar as is necessitated by the prior art.

I claim:

1. The method of preparing food for sea life which comprises the steps of:
   beating sea urchin eggs to break them open and reduce them to a homogeneous mass;
   adding a quantity sufficient to preserve said eggs, when homogenized, of sodium sulfite preservative to the eggs; adjusting the pH to a value in the range of 5.3 to 6.5;
   homogenizing the mixture of preservative and sea urchin eggs; and
   pasturizing the mixture.

2. The method defined in claim 1 in which the amount of sodium sulfite is 10 to 12 grams of sodium sulfite to 1 kilogram of sea urchin eggs.

3. The invention defined in claim 2 in which the pH of the mixture is adjusted to the range 5.3 to 6.5 by the addition of citric acid and in which a quantity of sodium chloride between 4 and 7 grams per kilogram of sea urchin eggs is added to the mixture.

4. The method defined in claim 1 in which a mixture of sea urchin eggs, sodium sulfite in the amount of 10 to 12 grams per kilogram of eggs, dried shrimp matter in an amount less than the amount of sea urchin eggs, water in the amount of 250 grams to 1 kilogram of water per kilogram of the combined urchin eggs and dried animal matter, a trace of salt, and citric acid to bring the mixture of a pH between 5.3 to 6.5, is blended to a smooth mixture prior to homoginization and pasturization.

5. A food for sea life comprising the blended homogenized and pasturized combination of washed sea urchin eggs and sodium sulfite in the ratio of 10 to 12 grams of sodium sulfite to 1 kilogram of sea urchin eggs.

6. The invention defined in claim 5 in which said sea urchin eggs are washed and said food includes sodium chloride in the ratio of 5 to 8 grams to 1 kilogram of washed sea urchin eggs and citric acid in an amount such that the pH of the combination is between 5.3 to 6.5.

* * * * *